United States Patent [19]

Putman

[11] Patent Number: 5,190,305
[45] Date of Patent: Mar. 2, 1993

[54] LUGGAGE HANDLING HAND CART

[75] Inventor: William A. Putman, Louisville, Ky.

[73] Assignee: Magline, Inc., Pinconning, Mich.

[21] Appl. No.: 812,650

[22] Filed: Dec. 23, 1991

[51] Int. Cl.$^5$ ............................ B62B 3/04; B62B 3/10
[52] U.S. Cl. ................................ 280/79.3; 280/47.35; 211/182; 211/206; 403/172; 403/176
[58] Field of Search ............. 280/87.01, 87.021, 47.34, 280/47.35, 79.11, 79.2, 79.3; 211/204, 206, 182, 189; 403/171, 172, 176; D34/17, 21, 22, 23, 26; 296/3

[56] References Cited

U.S. PATENT DOCUMENTS

| | | | |
|---|---|---|---|
| D. 92,125 | 5/1934 | Eastman | D34/22 |
| D. 99,074 | 3/1936 | Eastman | D34/22 X |
| D. 294,760 | 3/1988 | Vanderdoes, Sr. | 280/79.11 X |
| 1,764,226 | 6/1930 | Rennack | 403/171 |
| 2,171,681 | 9/1939 | Burke | 403/176 |
| 2,603,272 | 7/1952 | Rowand | 403/176 X |
| 2,696,396 | 12/1954 | Pittaluga | 403/171 |
| 3,144,946 | 8/1964 | Ellis | 211/206 X |
| 3,705,731 | 12/1972 | Berchak | 280/79.11 X |
| 5,090,725 | 2/1992 | Feldner | 280/79.3 X |

FOREIGN PATENT DOCUMENTS 339060  7/1959  Switzerland ..................... 280/79.3

OTHER PUBLICATIONS

Forbes catalog #111, Brass Luggage Carts and Bellman's Trucks, pub. 1986.
Harloff Manufacturing Company, Brass Luggage Carriers catalog. Pub. date Unknown.

Primary Examiner—Brian Johnson
Attorney, Agent, or Firm—Learman & McCulloch

[57] ABSTRACT

A luggage hand cart has a luggage supporting platform supported on wheels, with a pair of uprights extending upwardly from the platform at each end. The upper ends of the uprights are compoundly angled to extend inwardly relative to both the ends and sides of the platform and a pair of opposed, molded, generally Y-shaped plastic fittings, each having a base with a pair of projecting leg parts extending at a compound angle from the base outwardly relative to the sides and ends of the platform and downwardly, telescopically receive the upper ends of the uprights. The fittings each have internal wall structure and the longitudinally extending hanger rod then has its ends telescopically secured in the base portions of the fittings in abutting relation with internal wall structure head parts, while the upper ends of the uprights are secured in abutting relation with internal wall structure in the leg parts of the fittings.

7 Claims, 5 Drawing Sheets

LUGGAGE HANDLING HAND CART

BACKGROUND OF THE INVENTION

This invention relates to what are conventionally termed luggage carts, or bellman's trucks, of the type which have a lower luggage supporting platform, mounted usually on castered wheels and an upper support structure on which garment hangers and garment bags may be hung. Luggage carts of the type indicated are commercially available in a variety of structural configurations. For instance, there are so-called birdcage designs in which upright end rails extend upwardly from the corners of the platform and have their upper ends curved to extend to a longitudinally central fitting in which they are received. Such birdcage carts normally have a centrally dependent post which supports a longitudinally extending hanger rail. Other commercially available carts have planar end frames which join at their upper ends to linear hanger rods bridging the end frames. Luggage carts of the type proposed are in wide use in hotels, motels, hospitals, nursing homes, colleges and the like and are sold in normally disassembled condition so that they can be shipped in the smallest practical packages, and then assembled at the site of use.

SUMMARY OF THE INVENTION

The present invention is concerned with the concept of providing a cart having moldable fittings, requiring no machining, which can receive the compoundly angled upper ends of the platform corner uprights as well as the ends of the horizontal garment hanger rod which extends between the fittings. This provides a new and attractive style of cart which has the basic advantages of both older styles of cart mentioned, and none of the disadvantages. The fittings are generally Y-shaped in nature, but not truly so, because they have outwardly extending legs which extend from the base parts also at downwardly inclined angles, and, thus, will accommodate the upper ends of end upright members which have their upper ends curved to extend centrally inwardly and upwardly in a compound manner with respect to both the ends and sides of the lower platform, prior to terminating in linear terminal ends which are received in socket legs provided in the fittings. The base portions of the fittings support dependent hanger hooks which can be used to hang garment bags, for instance, while other garment bags and garment hangers are supported by the top rail which extends between the fittings.

In usage tests which were conducted in a hotel over a several year period, a prototype cart of this general construction, which had no hanger hooks and had metal fittings, withstood the rigors of the rough use to which such carts are subjected.

One of the prime objects of the present invention is to design a luggage cart of sufficiently rugged design which can be compactly shipped and, upon arrival, can be quickly and easily assembled by unskilled parties, using commonly available hand tools.

Still another object of the invention is to design a luggage cart of the character described which, while very attractive in appearance, can be fashioned of relatively inexpensive parts which, when assembled, provide a durable and reliable cart capable of handling maximum loads of luggage and garment bags.

Another object of the invention is to design a cart of lightweight construction which does not add undue weight to the loads being transported.

Another object of the invention is to design a low maintenance, modular luggage cart whose parts can be readily replaced when necessary.

Still a further object of the invention is to provide a readily loadable and unloadable cart, which is rigid when assembled, and smoothly and efficiently transports full loads.

Still a further object of the invention is to design a cart which will better accommodate and transport the hanging garment bags and luggage which are more prevalent today, and rigidly supports such hanging garments and bags in a manner to transport them smoothly.

Still another object of the invention is to design a cart which fits well into confined spaces such as elevators, and transports its loads compactly in a manner so that the loads do not interfere with elevator passengers and other luggage carriers.

A still further object of the invention is to provide a readily marketable luggage cart of simple construction which can be manufactured at relatively low cost and economically marketed.

Other objects and advantages of the invention will become apparent with reference to the accompanying drawings and the accompanying descriptive matter.

DESCRIPTION OF THE PREFERRED EMBODIMENT

Figure 1:
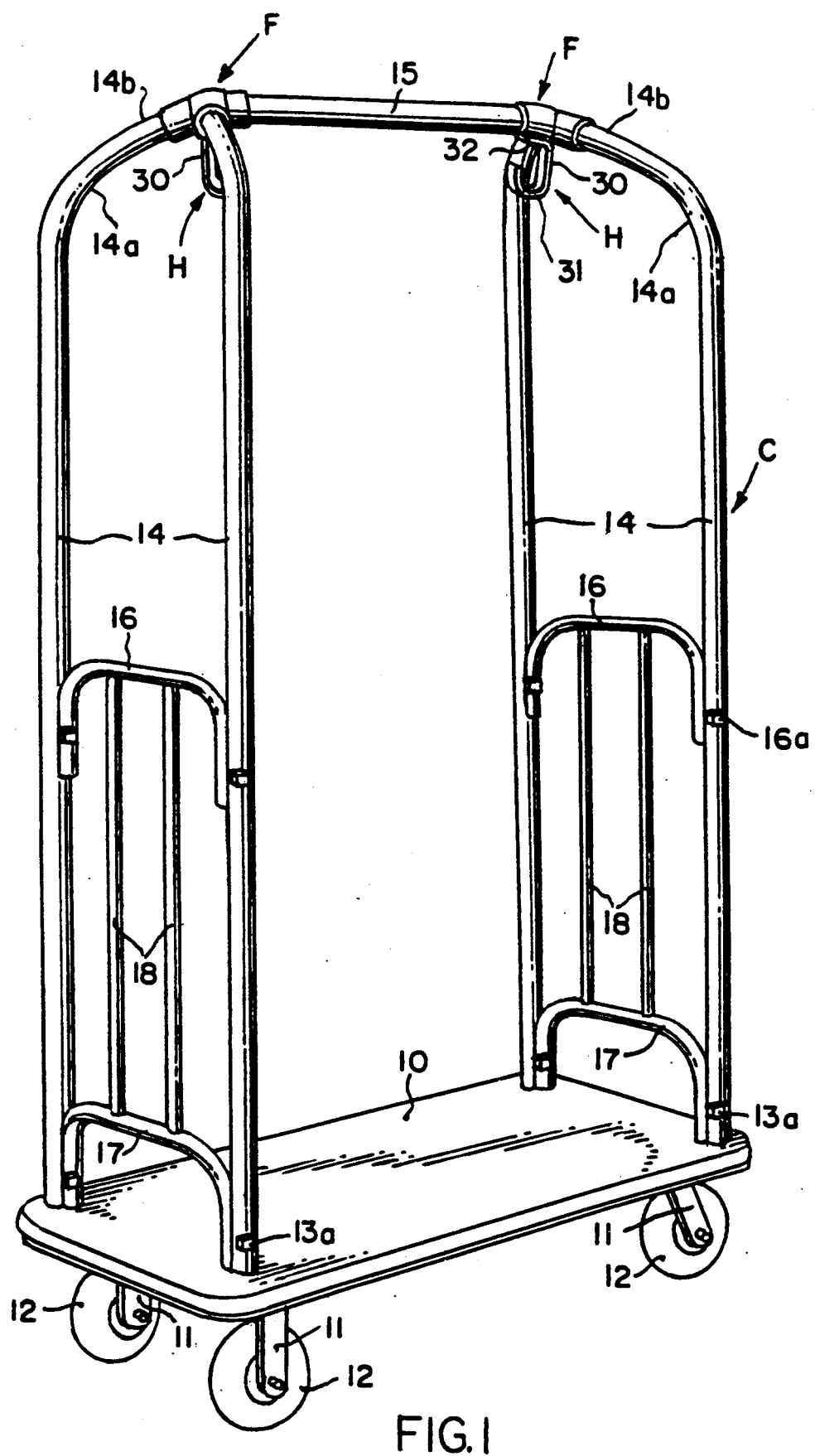
FIG. 1 is a perspective elevational view of the luggage handling hand truck.
Figure 2:
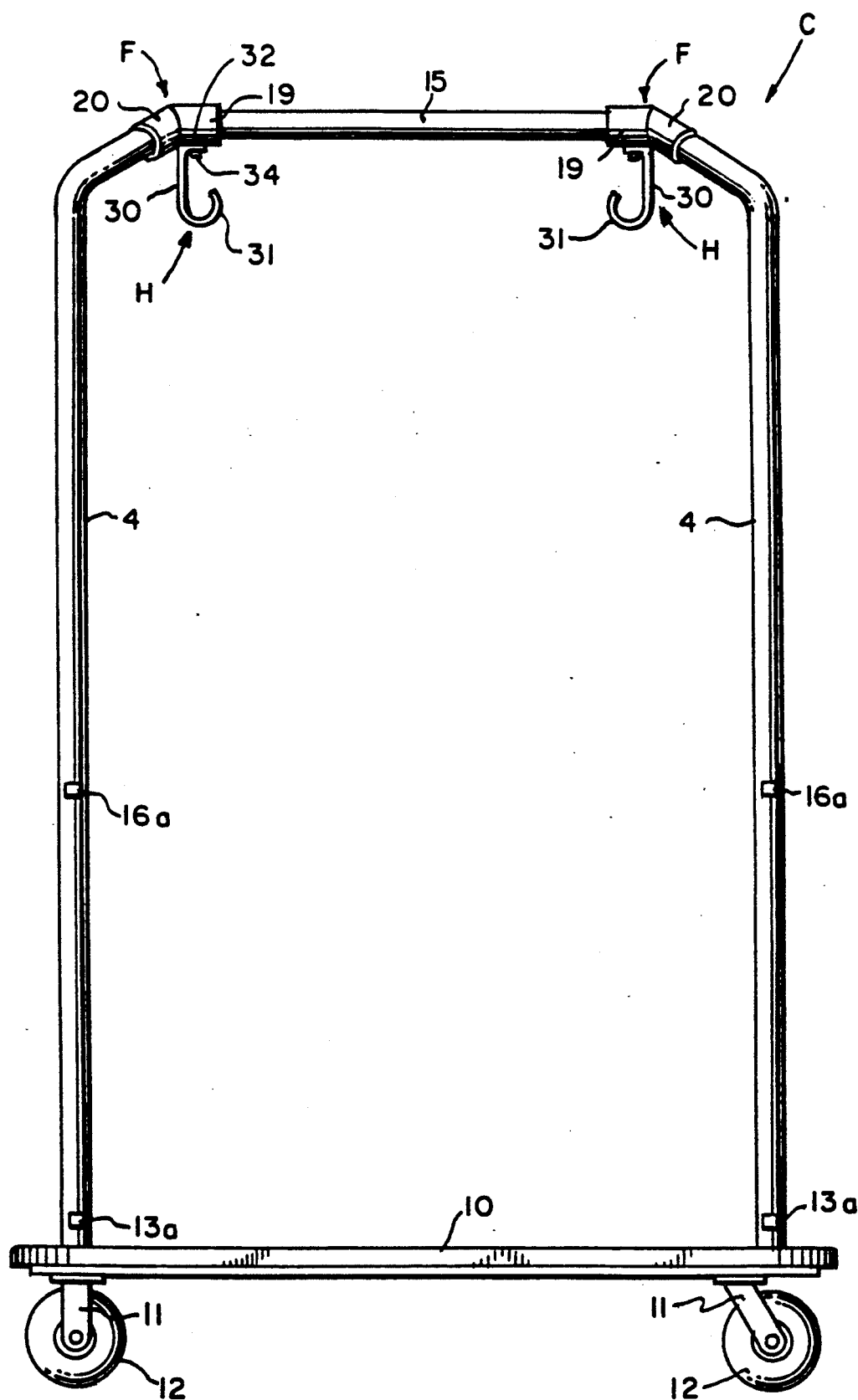
FIG. 2 is a side elevational view thereof.
Figure 3:
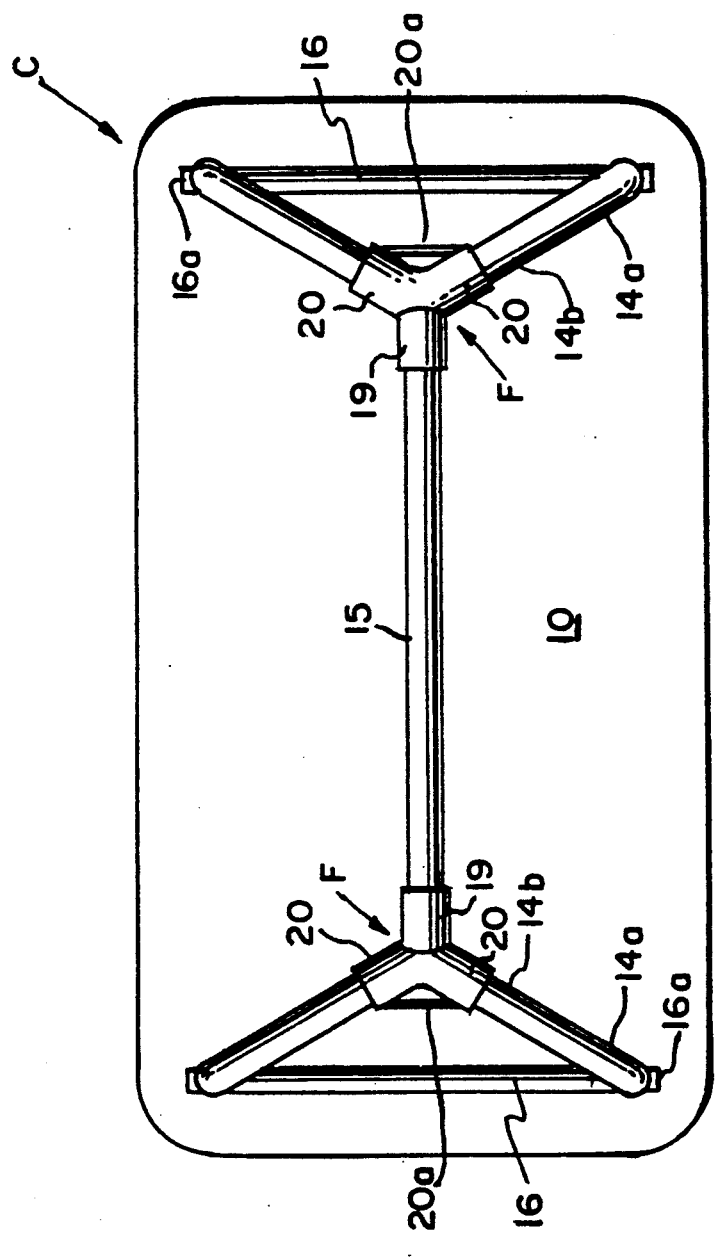
FIG. 3 is a top plan view thereof.
Figure 4:
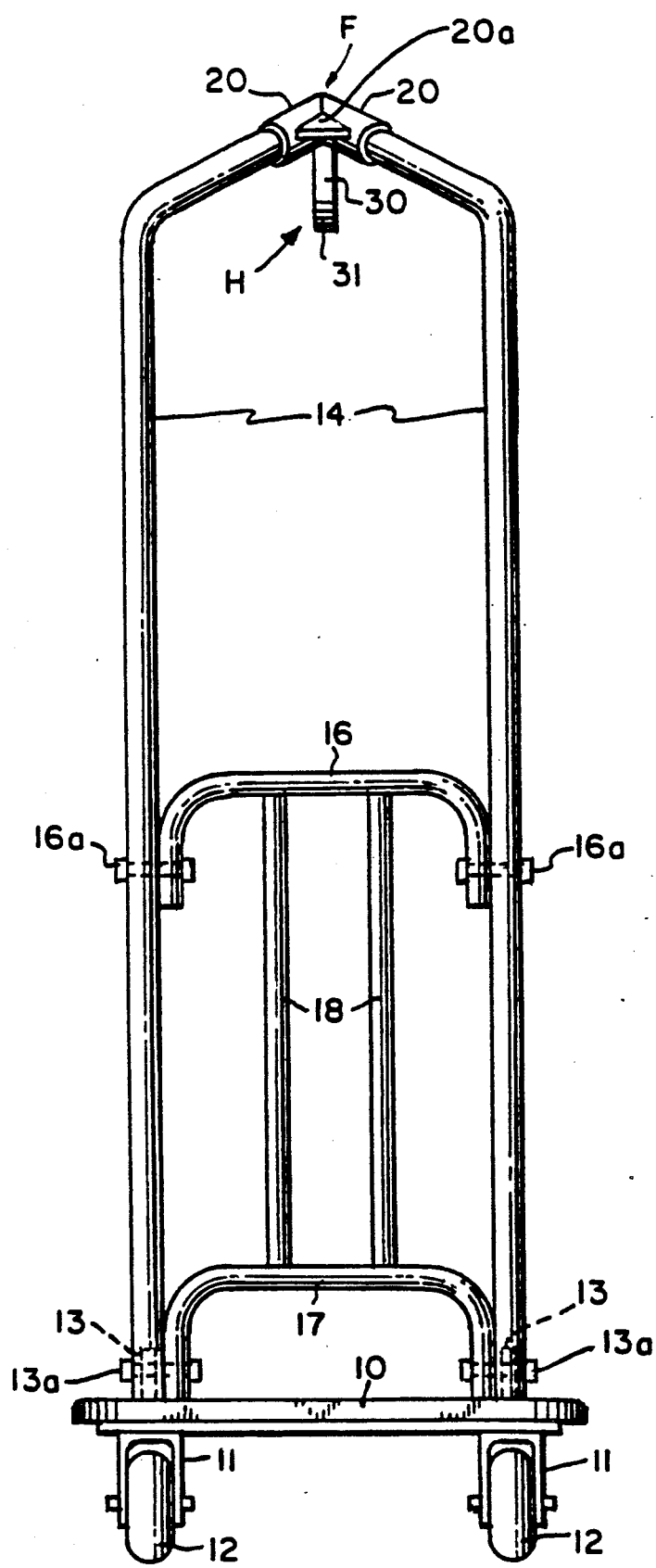
FIG. 4 is an end elevational view thereof, taken from either end of the cart.

Referring now more particularly to the accompanying drawings, in which a preferred embodiment of the invention is disclosed, a letter C is employed to generally designate the lightweight principally aluminum luggage cart, which includes a platform 10, supported by fork members 11 having a castered mounting to the underside of platform 10, on wheels 12. Provided at the four corners of the platform to snugly telescope over stubshafts 13 fixed on the upper surface of platform 10, are tubular aluminum upright cylindrical members 14, which at their upper ends have transition portions 14a which curve in a compound manner inwardly with respect to both the side and end edges of platform 10, and terminate in linear sections 14b which are received by molded Y-shaped synthetic plastic fittings, generally designated F. Bolts, or other suitable fasteners, 13a secure the uprights 14 in position.

The fittings F are molded of a tough rugged material, such as high density ABS, which can be chromium plated, and, while situated inwardly and centrally of the vertical portions of tubular members 14, provide adequate length between them for a tubular aluminum top rail or cross rod 15, with which they are in telescoping engagement. Affixed between the upright members 14, are a pair of upper and lower U-shaped brace members 16 and 17, respectively, which are connected by spaced retaining rods 18. Bolt fasteners 16a may be used to secure the braces 16, and the fasteners 13a can secure the braces 17.

Figure 5:
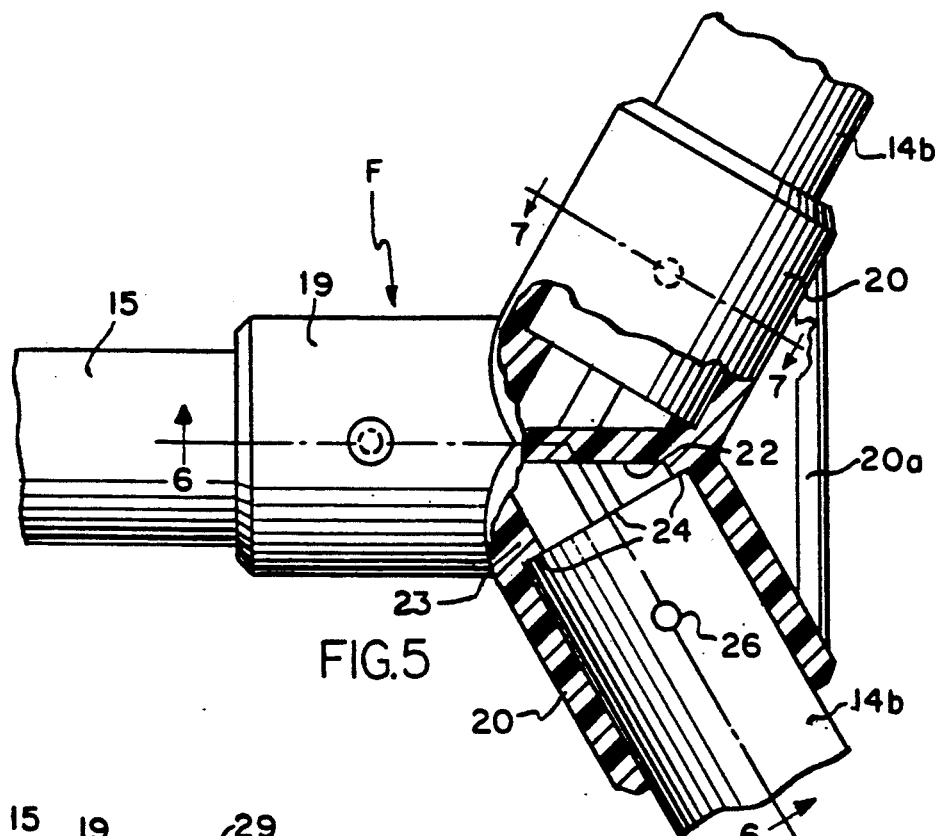
FIG. 5 is an enlarged, fragmentary, partly sectional, top plan view illustrating the manner in which the compoundly angled upper ends of the end uprights are received in the fittings which also support the garment hanger rail.
Figure 6:
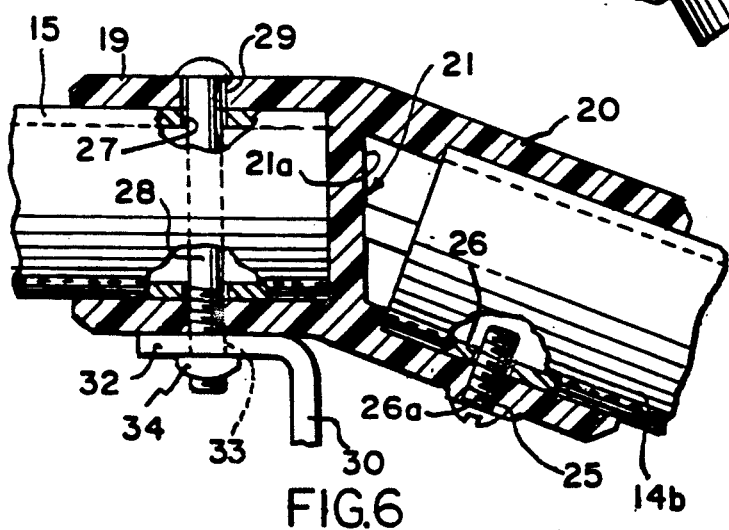
FIG. 6 is a fragmentary, sectional elevational view taken on the line 6—6 of FIG. 5.
Figure 7:
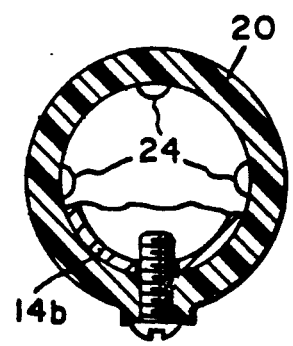
FIG. 7 is a transverse, cross-sectional view taken on the line 7—7 of FIG. 5.

The plastic fittings F are of special configuration and function to very rigidly connect the superstructure of the cart in a manner to provide maximum load bearing capacity. As FIGS. 5–7 indicate, each of the generally Y-shaped fittings F includes a tubular base portion 19 and a pair of divergent leg parts 20 which are connected by web 20a. The legs parts 20 not only extend in outwardly divergent relation from the base part 19, they also extend downwardly, and they telescopically receive the ends 14b of the uprights 14 in a manner to be shortly more specifically discussed. Internally, the fittings F are provided with integrated T-shaped interior wall structures, generally designated 21, having a head wall portion 21a and a leg portion 22. As FIGS. 5 and 6 further indicate, integral projections 23 within tubes 20 provide shoulders 24 seats for the end edges of tube portions 14b, a total of four circumferentially spaced stop shoulders 24 being provided internally within each of the leg portions 20. The shoulders 24, which provide stop surfaces for abutment with the ends of tube sections 14b, not only rigidly support them, but also locate them with respect to threaded openings 25 provided in the legs 20 and the openings 26 provided in the tube portions 14b, through which fastener screws 26a can extend. Similarly, the ends of central tubular rod 15 are received in abutting engagement with the internal wall 21 of each fitting F to provide a rigid structure, while at the same time locating the openings 27 provided in the ends of tube 15 for bolt members 28, which extend through transversely aligned openings 29 in the base parts 19 of the fittings F. As will be seen in FIGS. 1 and 6, hook members, generally designated H, include vertically extending legs 30 with curvilinear hook parts 31 and flanges 32, and the bolts 28 can extend through openings 33 in the flanges 32 and be secured in place by nuts 34.

THE OPERATION

It will be noted that the hooks H are oppositely disposed so that the hook portions 31 face one another. Luggage in the form of suitcases and folded garment bags are normally placed in superposed rows on the platform 10 in the usual manner, and unfolded garment bags can be readily hung from the hooks 31. Hanger supported garment bags, and garments supported by hangers, can be readily hung on the crossrod 15. Clearly, the cart is readily assembled from the compact disassembled condition in which it is shipped. The component parts 15, F, uprights 14, braces 16 and 17, rails 18, and wheel structures assemble easily to platform 10, with the use of only a screwdriver and wrench.

Although preferred embodiments of the invention have been illustrated in the accompanying drawings and described in the foregoing detailed description, it will be understood that the invention is not limited to the embodiments disclosed, but is capable of numerous rearrangements, modifications and substitutions of parts and elements without departing from the spirit of the invention which is defined in the following claims.

What is claimed is:
1. In a luggage handling hand cart,
   a. a luggage supporting rectilinear platform supported on wheels and having sides and ends with opposite corners;
   b. a pair of upright extending upwardly from the platform at each end thereof from the corners thereof and having upper ends;
   c. the upper ends of said upright being compoundly configured to extend inwardly relative to the ends of the platform and inwardly relative to the sides thereof;
   d. a pair of opposed, molded, generally Y-shaped synthetic plastic fittings, each having a base with a pair of projecting leg parts extending at a compound angle from said base outwardly relative to the ends of the platform and outwardly relative to the sides thereof for telescopically receiving the upper ends of the uprights above each end of said platform;
   e. and a top longitudinally extending cross rail, for supporting clothing hung on hangers, having ends telescopically received by said bases of the fittings;
   f. each of said fittings having a tubular base and leg parts for the reception of said top rail and the upper ends of the uprights, respectively, and also having internal wall structure with interior wall portions extending radially internally of each fitting leg part and integrated with said fitting leg parts internally, and further having a head portion extending radially internally of each fitting integrated with the base of the fitting internally;
   g. the top rail ends being in rigidly abutting relation with the internal head portions of the fittings and the upper ends of said uprights being in rigidly abutting relation with the interior wall portions of said fittings; and
   h. securing fastener means maintaining both said top rail ends and fitting internal head portions in rigidly abutting relation and said upright upper ends and interior wall portions of the fittings in rigidly abutting relation.

2. The cart of claim 1 wherein the leg parts of said fitting extend downwardly and said fittings have dependent hook members secured to the bases thereof.

3. The cart of claim 2 wherein said hook members include downwardly projecting legs with hook portions thereon, the hook legs being disposed outwardly of the hook portions so that the hook portions face one another.

4. The cart of claim 1 wherein said internal wall structure in the fittings includes a T-shaped wall with a leg portion bridging said fitting leg parts internally.

5. The cart of claim 1 wherein said fastener means includes bolts extending through said fitting bases and ends of the top rail at each end of the cart and a hook having a horizontally extending base is secured to each fitting by one of said bolts.

6. The cart of claim 4 wherein stop shoulders, molded integrally with said T-shaped wall and the internal walls of said fitting tubular leg parts, project in an axial direction in said fitting leg parts to abut the ends of the uprights received in said fitting leg parts.

7. In a method of constructing a luggage handling hand cart with a luggage supporting rectilinear platform having sides and ends with opposite corners supported on wheels, uprights with upper ends extending upwardly from the platform at the corners thereof, the upper ends of said uprights being compoundly angled to extend inwardly relative to the ends of the platform and inwardly relative to the sides thereof, a pair of generally Y-shaped molded, synthetic plastic fittings, each having a pair of outwardly and downwardly projecting leg parts, extending at a compound angle from a base, configured for telescopically receiving the upper ends of the uprights above each end of said platform, and a centrally longitudinally extending garment hanger rail having ends telescopically receivable by said bases of the fittings, each of the fittings having a tubular base and leg parts for the reception of said garment hanger rail and the upper ends of the uprights, respectively, and also having internal wall structure with interior wall portions extending radially internally of each fitting leg part and integrated with said fitting leg parts internally, and further having a head portion bridging said base of the fitting internally, comprising the steps of:

a. assembling the uprights to the wheeled platform, disposing the generally Y-shaped fittings in opposed relation and receiving the upper ends of the uprights in said leg parts of the Y-shaped fittings, and receiving the ends of the garment hanger rail in the bases of the fittings;

b. placing the garment hanger rail ends in rigidly abutting relation with internal head portions of the fittings and the upper ends of said uprights in rigidly abutting relation with the interior wall portions in said fitting leg parts; and c. securing fastener means maintaining both said garment hanger rail ends and fitting internal head portions in rigidly abutting relation and said upright upper ends and fitting interior wall portions in rigidly abutting relation.

* * * * *

UNITED STATES PATENT AND TRADEMARK OFFICE
CERTIFICATE OF CORRECTION

PATENT NO. : 5,190,305
DATED     : March 2, 1993
INVENTOR(S) : William A. Putman It is certified that error appears in the above-identified patent and that said Letters Patent is hereby corrected as shown below:

Column 4, line 6, change "upright" to -- uprights --; line 9, change "upright" to -- uprights --; line 44, change "fitting" to -- fittings --.

Column 6, line 10, after "with" insert -- the --.

Signed and Sealed this

Sixteenth Day of November, 1993

Attest:

BRUCE LEHMAN

Attesting Officer

Commissioner of Patents and Trademarks